(12) United States Patent
Dagenais

(10) Patent No.: US 9,020,744 B2
(45) Date of Patent: Apr. 28, 2015

(54) LOAD SENSOR FOR A VEHICLE ELECTRONIC STABILITY SYSTEM

(71) Applicant: Bombardier Recreational Products Inc., Valcourt (CA)

(72) Inventor: Mario Dagenais, Foster (CA)

(73) Assignee: Bombardier Recreational Products Inc., Valcourt (CA)

( * ) Notice: Subject to any disclaimer, the term of this patent is extended or adjusted under 35 U.S.C. 154(b) by 0 days.

(21) Appl. No.: 14/026,435

(22) Filed: Sep. 13, 2013

(65) Prior Publication Data

US 2014/0012482 A1  Jan. 9, 2014

Related U.S. Application Data

(63) Continuation of application No. 13/553,153, filed on Jul. 19, 2012, now Pat. No. 8,577,588, which is a continuation of application No. 11/864,265, filed on Sep. 28, 2007, now Pat. No. 8,260,535.

(51) Int. Cl.
| | |
|---|---|
| *G06F 17/00* | (2006.01) |
| *G06G 7/48* | (2006.01) |
| *B60W 30/02* | (2012.01) |
| *B60T 8/17* | (2006.01) |
| *B60T 8/1755* | (2006.01) |

(Continued)

(52) U.S. Cl.
CPC .............. *B60W 30/02* (2013.01); *B60T 8/1706* (2013.01); *B60T 8/1755* (2013.01); *B60T 8/18* (2013.01); *B60T 8/24* (2013.01); *B60T 8/246* (2013.01); *B60T 2230/03* (2013.01); *B60T 2240/06* (2013.01); *B60T 2250/02* (2013.01); *B62K 5/027* (2013.01); *B62K 5/05* (2013.01)

(58) Field of Classification Search
CPC combination set(s) only.
See application file for complete search history.

(56) References Cited

U.S. PATENT DOCUMENTS

| | | |
|---|---|---|
| 2,606,626 A | 8/1952 | Meyer |
| 2,911,053 A | 11/1959 | Ayers et al. |

(Continued)

FOREIGN PATENT DOCUMENTS

| | | |
|---|---|---|
| DE | 19846352 A1 | 4/1999 |
| DE | 102006012246 A1 | 3/2007 |

(Continued)

OTHER PUBLICATIONS

English Abstract of JP11180274, Published Jul. 6, 1999; Retrieved from the Internet: http://www19.ipdl.inpit.go.jp/PA1/cgi-bin/PA1DETAIL on Jun. 6, 2013.

(Continued)

*Primary Examiner* — Bhavesh V Amin
(74) *Attorney, Agent, or Firm* — BCF LLP

(57) ABSTRACT

A method of controlling a three-wheeled vehicle comprises: determining a state of a load sensor associated with a portion of vehicle; selecting a first start mass when the load sensor is in a non-loaded state; selecting a second start mass when the load sensor is in a loaded state; determining at least one vehicle parameter during operation of the vehicle; determining a calculated mass based at least in part on the at least one vehicle parameter; determining an effective mass based at least in part on the calculated mass and a selected one of the first and second start masses; defining an output of an electronic stability system of the vehicle based at least in part on the effective mass; and controlling a stability of the vehicle using the output of the electronic stability system.

19 Claims, 10 Drawing Sheets

(51) Int. Cl.
*B60T 8/18* (2006.01)
*B60T 8/24* (2006.01)
*B62K 5/027* (2013.01)
*B62K 5/05* (2013.01)

(56) References Cited

U.S. PATENT DOCUMENTS

| | | |
|---|---|---|
| 3,414,074 A | 12/1968 | Dannettell |
| 3,507,350 A | 4/1970 | Boyajian |
| 3,807,343 A | 4/1974 | Peebles |
| 4,270,716 A | 6/1981 | Anderson |
| 4,458,115 A | 7/1984 | Petersom |
| 4,743,213 A | 5/1988 | Nishida |
| 4,941,854 A | 7/1990 | Takahashi et al. |
| 5,397,890 A | 3/1995 | Schueler et al. |
| 6,086,168 A | 7/2000 | Rump |
| 6,263,261 B1 | 7/2001 | Brown et al. |
| 6,324,446 B1 | 11/2001 | Brown et al. |
| 6,324,447 B1 | 11/2001 | Schramm et al. |
| 6,338,012 B2 | 1/2002 | Brown et al. |
| 6,409,286 B1 | 6/2002 | Fennel |
| 6,446,024 B1 | 9/2002 | Leimbach et al. |
| 6,450,845 B1 | 9/2002 | Snyder et al. |
| 6,465,907 B2 | 10/2002 | Ueno et al. |
| 6,643,573 B2 | 11/2003 | Dickinson et al. |
| 6,745,112 B2 | 6/2004 | Mori |
| 6,772,061 B1 | 8/2004 | Berthiaume et al. |
| 6,876,917 B1 | 4/2005 | Bates, Jr. et al. |
| 6,951,203 B2 | 10/2005 | Spaulding |
| 7,068,178 B2 | 6/2006 | Oh |
| 7,350,787 B2 | 4/2008 | Voss |
| 7,480,547 B2 | 1/2009 | Brown et al. |
| 7,523,803 B2 | 4/2009 | Breed |
| 8,260,535 B2 | 9/2012 | Dagenais |
| 2002/0180166 A1 | 12/2002 | Voss |
| 2004/0066023 A1 | 4/2004 | Joseph |
| 2006/0180372 A1* | 8/2006 | Mercier et al. ............ 180/210 |
| 2008/0272560 A1 | 11/2008 | Voss |
| 2009/0084623 A1 | 4/2009 | Dagenais |

FOREIGN PATENT DOCUMENTS

| | | |
|---|---|---|
| EP | 2055617 A1 | 5/2009 |
| JP | 11180274 | 7/1999 |
| WO | 03058359 A1 | 7/2003 |
| WO | 2006097498 A1 | 9/2006 |
| WO | 2007130043 A1 | 11/2007 |

OTHER PUBLICATIONS

English Abstract of DE102006012246, Published Mar. 15, 2007; Retrieved from http://v3.espacenet.com/ on Nov. 11, 2008.
English Abstract of DE19846352, Published Apr. 22, 1999; Retrieved from http://v3.espacenet.com/ on Nov. 11, 2008.
International Search Report of PCT/US2008/070129; Nov. 5, 2008; Marx Winfried.

* cited by examiner

LOAD SENSOR FOR A VEHICLE ELECTRONIC STABILITY SYSTEM

CROSS-REFERENCE

The present application is a continuation of U.S. patent application Ser. No. 13/553,153, filed Jul. 19, 2012, which is a continuation of U.S. Pat. No. 8,260,535 B2, issued Sep. 4, 2012, the entirety of both of which is incorporated herein by reference. The entirety of each of the following documents is also incorporated herein by reference: U.S. Provisional Patent Application Ser. Nos. 60/547,092 (filed Feb. 25, 2004), 60/547,089 (filed Feb. 25, 2004), 60/496,905 (filed Aug. 22, 2004); U.S. patent application Ser. No. 10/920,226 (filed Aug. 18, 2004); International Application No. PCT/US2006/017477 (filed May 5, 2006); and U.S. Pat. Nos. 6,263,261 (issued Jul. 17, 2001); 6,324,446 (issued Nov. 27, 2001); 6,086,168 (issued Jul. 11, 2000); 6,409,286 (issued Jun. 25, 2002); 6,338,012 (issued Jan. 8, 2002); 6,643,573 (issued Nov. 4, 2003); and 6,745,112 (issued Jun. 1, 2004).

FIELD OF THE INVENTION

The present invention relates to a vehicle with an electronic stability control system based at least in part on the mass of the vehicle, passenger and cargo.

BACKGROUND

Small urban transport vehicles are convenient for the limited amount of parking space they require. They also require less energy to move given their reduced mass. Small off-road vehicles are used on rougher terrain and offer similar advantages. Such vehicles typically have recumbent seats or a single straddle seat, like all-terrain vehicles (also known as "ATVs").

These light mass vehicles have three or four wheels. In the case of a three-wheeled vehicle, two different configurations are generally known. The first configuration has two wheels at the front and one wheel at the back. The second configuration has one wheel at the front and two wheels at the back.

The height of the center of gravity (CG) of a vehicle has a significant influence on the dynamic stability of the vehicle. The vertical position of the CG is measured as a distance from the ground when the vehicle is at rest. For a vehicle having a straddle seat, the elevated position of the seat generally results in a high CG. This is a factor that particularly affects the stability of a light mass vehicle using a straddle type seat. The position of the center of gravity also changes according to the presence and the driving position of the driver on the straddle seat. The presence of a passenger also has a significant effect given that the additional mass of the passenger accounts for a significant portion of the mass of the loaded vehicle.

Recumbent type seat vehicles are generally more stable since they have a lower CG when loaded but they require additional space. Recumbent type seats include bucket seats of the type usually found in four-wheeled vehicles. Recumbent seat configurations in a four-wheeled vehicle generally position two riders side-by-side.

While straddle seats may alter disadvantageously the center of gravity of a vehicle, they offer certain advantages that are not available with recumbent seats. In particular, straddle seats allow the driver to adopt a more compact riding position, allow for a better vision since the driver is disposed higher, and permit the rider to lean into a turn for enhanced handling.

An advantage of a vehicle having a tandem straddle type seat, which can accommodate a driver and a passenger behind the driver is that the center of gravity of the vehicle remains laterally symmetrically positioned when the vehicle is upright regardless of whether a passenger is present or not. In contrast, on a light mass recumbent vehicle having side-by-side seats, when only the driver is present, the center of gravity is not laterally located in the same position as when there are two riders in the vehicle. When only a driver is present onboard a vehicle with side-by-side recumbent seats, the center of gravity will be offset from the longitudinal centerline of the vehicle in a direction toward the driver. As would be appreciated by those skilled in the art, this offset may have an effect on the handling performance of the side-by-side recumbent seat vehicle.

Other factors that affect stability include the distance between the tires—the track width. On a vehicle, the wheel base refers to the distance between the front tire(s) and the rear tire(s). The wheel track, on the other hand, refers to the distance between two tires on the same axle. A larger distance between the tires (whether it be the wheel base or the wheel track) enhances the stability of the vehicle, but creates a larger vehicle, in terms of overall length and width, that may be less manoeuvrable because of the vehicle's increased size.

When operating any vehicle, especially a three-wheeled vehicle, stability is a concern during turning. When negotiating a curve, a vehicle is subject to centrifugal forces, as is readily understood by those of ordinary skill in the art of vehicle design. Generally, a higher center of gravity causes the vehicle to have a lower rollover threshold than a vehicle with a lower center of gravity due to centrifugal forces.

Three-wheeled vehicles raise special stability concerns since they have a smaller total footprint area with the ground than a similar sized four-wheeled vehicle. Also, three-wheeled vehicles tend to have a smaller mass. Therefore, they are also more affected by load variations, such as driver, passenger and cargo mass.

As would be appreciated by those skilled in the art, modern road tires can offer considerable grip on a road surface. The gripping force of modern road tires can be so strong, in fact, that a vehicle with a high center of gravity may be subjected to centrifugal forces that may cause the vehicle to exceed its rollover threshold. If the rollover threshold is exceeded, one or more of the vehicle's wheels on the inner side of the curve may lift off of the road surface, which may lead in some circumstances to the vehicle rolling over. Rollover can also occur under severe over steering conditions when the tires suddenly recover traction with the ground or hit an obstacle sideways.

For these reasons, Electronic Stability Systems (ESS) have been developed to improve the stability of such vehicles.

ESS, also known as Vehicle Stability Systems (VSS), are designed to electronically manage different systems on a vehicle to influence and control the vehicle's behaviour. An ESS can manage a considerable number of parameters at the same time. This provides an advantage over a vehicle having no such system since the driver can only manage a limited number of parameters at the same time and has a slower reaction time. A typical ESS takes several inputs from the vehicle and applies different corrective measures back to the vehicle to influence the vehicle's behaviour. Examples of inputs include steering column rotation, longitudinal and transverse acceleration of the vehicle, engine output, brake and accelerator pedal displacement, rotational speed of the wheels, and brake pressure in the brake system amongst others.

The outputs from the ESS affect the vehicle's behaviour generally by independently managing the brakes on each wheel, the suspension, and the power output of the engine in order to improve the vehicle's handling under certain circumstances.

However, since the load (rider, passenger, cargo mass) applied to light mass vehicle has a significant impact on its handling characteristics, as previously mentioned, the ESS may take insufficient corrective measures when the vehicle is heavily loaded or may unnecessarily limit the vehicle performance when the vehicle is lightly loaded depending on the ESS calibration.

Therefore, there is a need for a system that controls the stability of a light mass vehicle that takes into consideration the overall mass of the vehicle (vehicle, driver, passenger).

SUMMARY

It is an object of the present invention to ameliorate at least some of the inconveniences present in the prior art.

In one aspect, a method of controlling a three-wheeled vehicle is disclosed. The three-wheeled vehicle has a frame, three wheels attached to the frame; and a straddle seat supported by the frame. The straddle seat defines a driver portion and a passenger portion adjacent to the driver portion. The method comprises: determining a state of a load sensor associated with a portion of vehicle; selecting a first start mass when the load sensor is in a non-loaded state; selecting a second start mass when the load sensor is in a loaded state; determining at least one vehicle parameter during operation of the vehicle; determining a calculated mass based at least in part on the at least one vehicle parameter; determining an effective mass based at least in part on the calculated mass and a selected one of the first and second start masses; defining an output of an electronic stability system of the vehicle based at least in part on the effective mass; and controlling a stability of the vehicle using the output of the electronic stability system.

In a further aspect, the first start mass is based on a driver-and-vehicle combined mass, and the second start mass is base one a driver-and-passenger-and-vehicle combined mass.

In an additional aspect, determining the at least one vehicle parameter during operation of the vehicle includes determining an acceleration of the vehicle.

In a further aspect, determining the acceleration of the vehicle includes obtaining the acceleration of the vehicle from a longitudinal accelerometer of the vehicle.

In an additional aspect, determining the at least one vehicle parameter during operation of the vehicle further includes determining a torque provided by an engine of the vehicle. The calculated mass is determined based on the acceleration of the vehicle and the torque provided by the engine.

In a further aspect, the calculated and effective masses are not determined when the acceleration of the vehicle is outside of a predetermined range.

In an additional aspect, determining the at least one vehicle parameter during operation of the vehicle includes determining a torque provided by an engine of the vehicle.

In a further aspect, determining the torque provided by the engine of the vehicle includes: obtaining a degree of throttle opening from a throttle position sensor; and obtaining a speed of the engine from an engine speed sensor.

In an additional aspect, determining the at least one vehicle parameter during operation of the vehicle includes determining a deceleration of the vehicle.

In a further aspect, determining the deceleration of the vehicle includes obtaining the deceleration of the vehicle from a longitudinal accelerometer of the vehicle.

In an additional aspect, determining the at least one vehicle parameter during operation of the vehicle further includes determining a brake torque. The calculated mass is determined based on the deceleration of the vehicle and the brake torque.

In a further aspect, the calculated and effective masses are not determined when the deceleration of the vehicle is outside of a predetermined range.

In an additional aspect, determining the at least one vehicle parameter during operation of the vehicle includes determining a brake torque.

In a further aspect, determining the brake torque includes obtaining a brake pressure from a brake pressure sensor.

In an additional aspect, the method further comprises determining if the vehicle is turning. The calculated and effective masses are not determined when the vehicle is turning.

In a further aspect, determining if the vehicle is turning is based on an input from a steering angle sensor.

In an additional aspect, determining the effective mass includes: determining a difference between the calculated mass and the selected one of the first and second start masses; determining a percentage of the difference to be applied to the selected one of the first and second start masses; adding the percentage of the difference to the selected one of the first and second start masses when the calculated mass is greater than the selected one of the first and second start masses; subtracting the percentage of the difference from the selected one of the first and second start masses when the calculated mass is smaller than the selected one of the first and second start masses.

In a further aspect, the method further comprises repeating the steps of determining the at least one vehicle parameter, the calculated mass and the effective mass over a number of iterations. The percentage of the difference to be applied to the selected one of the first and second start masses increases as the number of iterations increases.

In an additional aspect, the method further comprises validating the state of the load sensor when the load sensor is determined to be in a loaded state by applying a delay after the load sensor is determined to be in a loaded state.

For purposes of the application, terms related to spatial orientation, such as "left", "right", "front", "rear", "up", and "down", are defined according to the normal, forward travel direction of a vehicle. As a result, the "left" side of a vehicle corresponds to the left side of a rider seated in a forward-facing position on the vehicle.

Embodiments of the present invention each have at least one of the above-mentioned objects and/or aspects, but do not necessarily have all of them. It should be understood that some aspects of the present invention that have resulted from attempting to attain the above-mentioned objects may not satisfy these objects and/or may satisfy other objects not specifically recited herein.

Additional and/or alternative features, aspects, and advantages of embodiments of the present invention will become apparent from the following description, the accompanying drawings, and the appended claims.

BRIEF DESCRIPTION OF THE DRAWINGS

For a better understanding of the present invention, as well as other aspects and further features thereof, reference is made to the following description which is to be used in conjunction with the accompanying drawings, where.

DETAILED DESCRIPTION

Reference will now be made in detail to present embodiments of the invention, one or more examples of which are illustrated in the accompanying drawings. Each example is provided by way of explanation of the invention, not limitation of the invention. It will be apparent to those skilled in the art that modifications and variations can be made to the described embodiments without departing from the scope or spirit of the invention. For instance, features illustrated or described as part of one embodiment may be used on another embodiment to yield a further embodiment.

Figure 1:
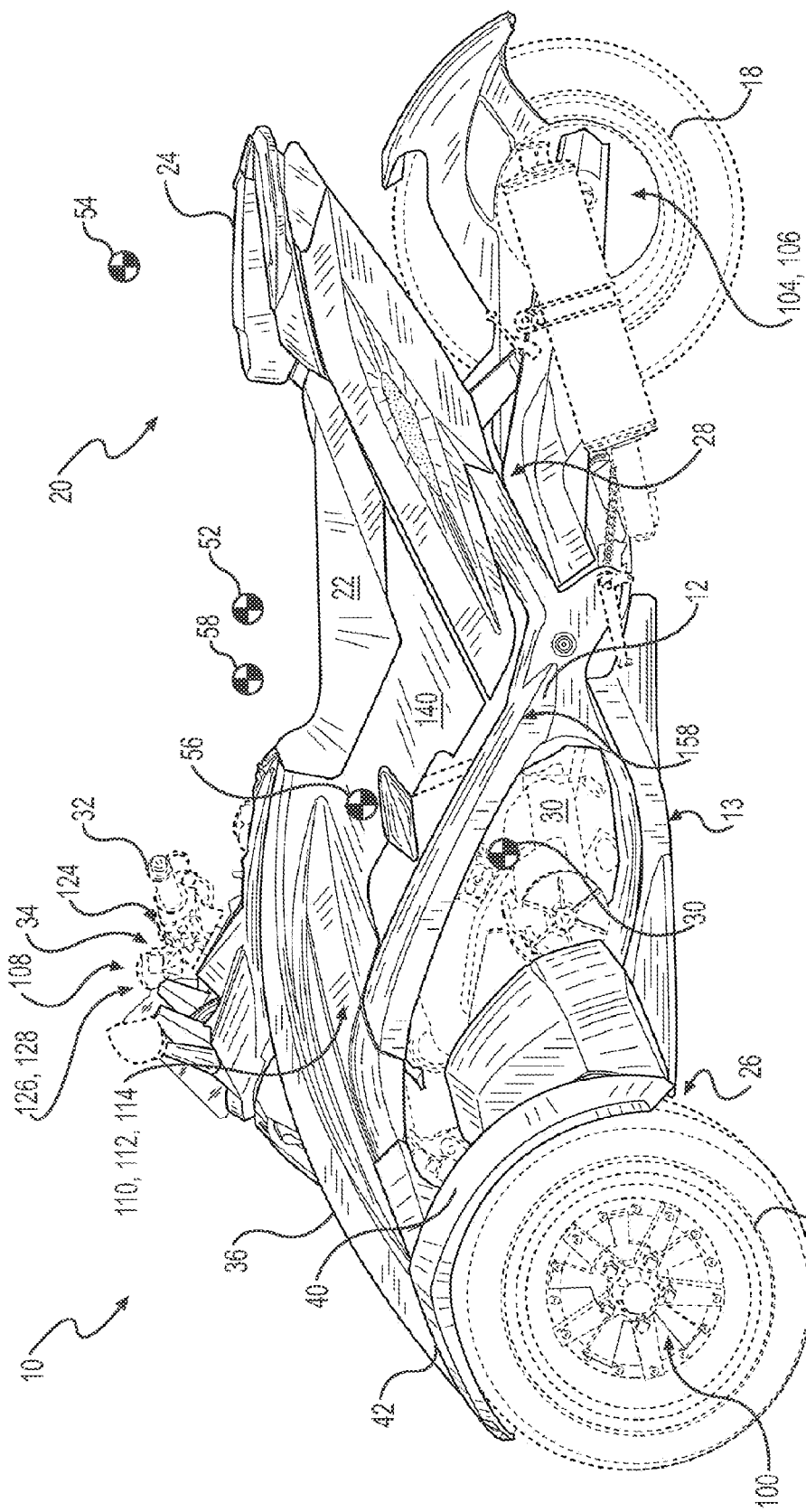
FIG. 1 is a left side elevation view of a three-wheeled vehicle according to one embodiment of the present invention.
Figure 2:
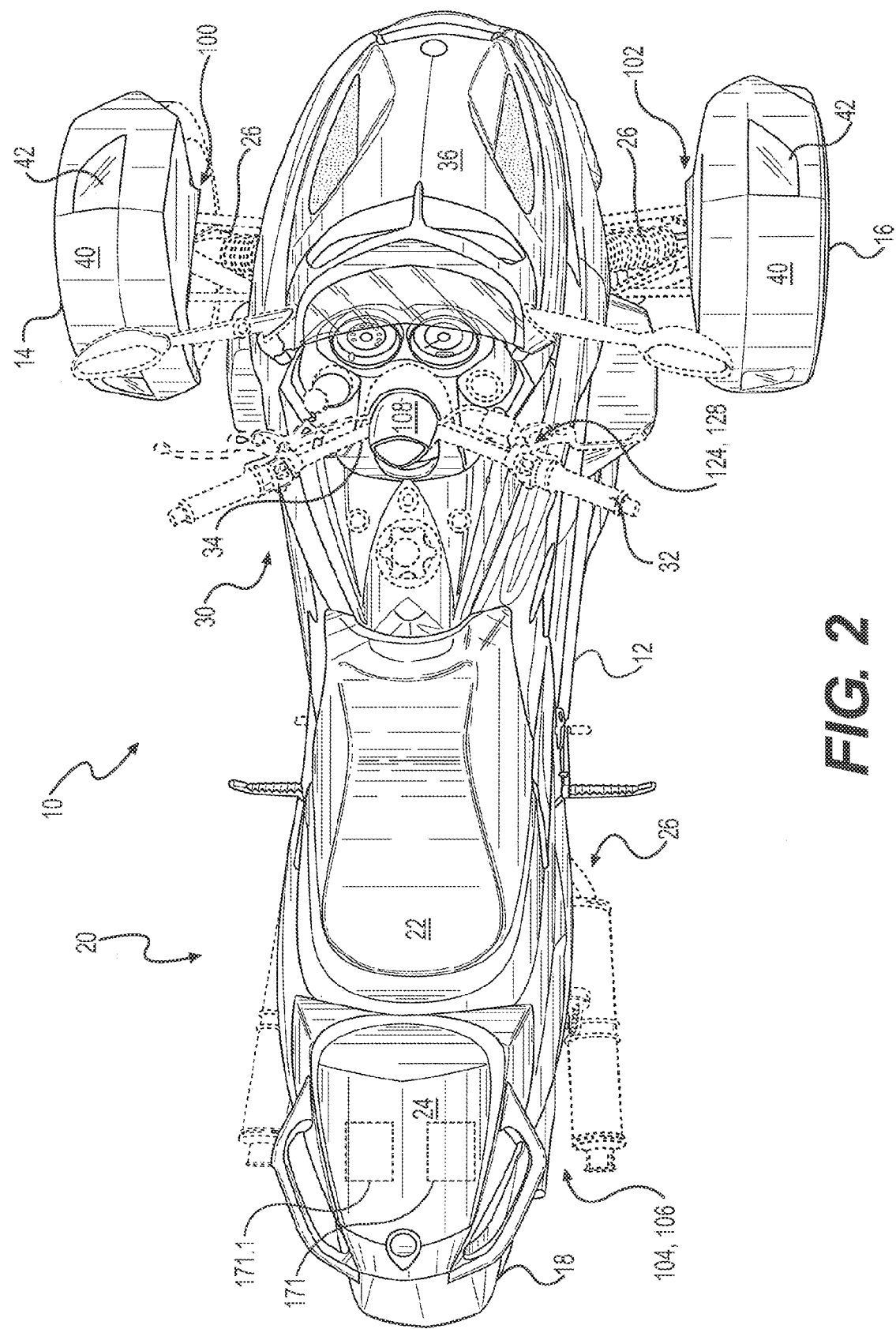
FIG. 2 is a top plan view of the three-wheeled vehicle of FIG. 1.
Figure 3:
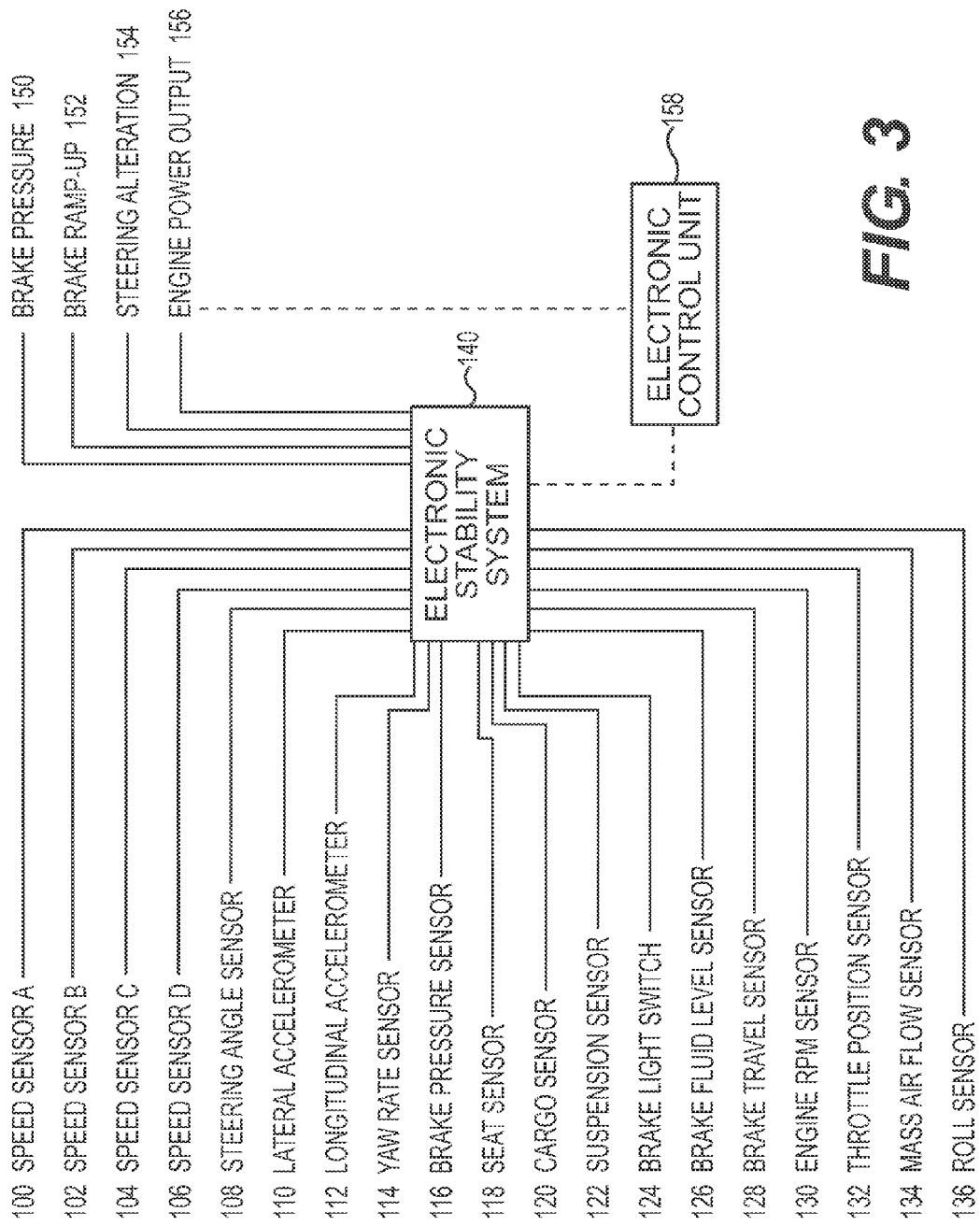
FIG. 3 is a schematic diagram depicting a plurality of sensors and a plurality of outputs associated with an Electronic Stability System according to one embodiment of the present invention.

A three-wheeled straddle-type vehicle 10 in accordance with the present invention is generally illustrated in FIGS. 1-3. The vehicle 10 has a longitudinal axis and includes a left front wheel 14, a right front wheel 16 and a rear wheel 18. The front wheels 14, 16 are equally offset from the longitudinal axis, and the rear wheel 18 is aligned with the longitudinal axis. The left and right front wheels 14, 16 and the rear wheel 18 each have a tire. The rear wheel 18 may include multiple rims, with each rim accommodating a tire. In the case of a multi-rim arrangement, the rims would be rigidly connected to form a single wheel. For purposes of simplicity, when the rear tire is referred to in this application, it will be understood that the rear tire may include multiple tire components mounted on individual rims but acting as a single wheel.

The tires have a friction coefficient in accordance with the tire manufacturer's specifications. Each of the wheels 14, 16 and 18 is sized to accommodate a 15-inch automobile tire for example. The present invention, however, is not limited to equal sized wheels; rather, it is contemplated that the front wheels 14, 16 may be smaller in size to accommodate 13-inch automobile tires for example. Furthermore, other wheel sizes are considered to be well within the scope of the present invention.

The front wheels 14, 16 are supported by a front suspension assembly 26. The rear wheel 18 is supported by a rear suspension assembly 28. The front suspension assembly 26 and the rear suspension assembly 28 are secured to a vehicle frame assembly 12 illustrated in FIG. 1. The front suspension assembly 26 illustratively includes a pair of suspension support arms (A-arms) and a shock absorber extending from each side of the frame assembly 12 to support each front wheels 14, 16. The rear suspension assembly 28 illustratively includes a rear swing arm assembly that is attached to the frame assembly 12 by an axle that extends through the frame assembly 12.

As shown in FIG. 1, the rear swing arm assembly includes a rear swing arm 28 that is pivotally supported by an axle, which is retained in a pivot bore to the frame 12. The swing arm 28 is formed in a generally U-shape with a pair of parallel arm portions, that extend rearwardly from the front pivot axis of the swing arm 28 to the rear tires. The rear swing arm 28 is suspended from the frame assembly 12 and is biased by a shock absorber and spring assembly. By this arrangement, the rear wheel 18 has a controlled range of pivotal movement about a lateral axis with respect to the frame assembly 12.

As illustrated in FIG. 1, the outer side of the frame spar is visible from the left side of the vehicle 10. Preferably, the frame assembly 12 is a tubular frame, with at least some of the frame elements being formed of tubular members. The tubular members can have any cross section, including but not limited to square, rectangular, circular, oval and channel shaped. As such, tubular members contemplated by this invention include both closed and open cross sections, which may be made by casting, forging, stamping, or extrusion. The advantage of tubular members is that such elements are very strong, yet lightweight. An engine 30 is secured to the vehicle frame assembly 12 adjacent to an engine cradle assembly 13. The engine 30 may be secured directly to the frame assembly 12 at several points of attachment. Alternatively, the engine 30 may be secured to the frame assembly 12 using a suitable mounting assembly, not shown. The engine 30 can be a structural element of the frame assembly 12 adding rigidity. Alternatively, the engine 30 may be merely supported by the frame assembly 12.

The engine 30 is supported just behind the front suspension assembly 26 immediately above the lowest part of the frame assembly 12. This positioning provides a low center of gravity, which is useful in ensuring good handling and stability of the vehicle 10. Because of the rigidity and structural strength of the frame assembly 12, the engine 30 can generate 50-150 horsepower or more without sacrificing stability and/or manoeuvrability of the vehicle 10. The frame assembly 12 provides sufficient structural rigidity to withstand the forces created during high performance operation of the vehicle 10. The engine 30 illustratively is an internal combustion engine and is preferably a four-stroke engine. In particular, the engine 30 may be a 1000 cc V-twin (V2) four-stroke engine manufactured by ROTAX®. The vehicle 10 in accordance with the present invention, however, is not limited to a 1000 cc engine. It is also contemplated that a 600 cc engine may be used. Furthermore, other engine displacement sizes are considered to be well within the scope of the present invention. Moreover, while a four-stroke engine is contemplated for use on the vehicle 10, a two-stroke engine also may be employed. Alternatively, hybrid powerpack or electric motor could also power the vehicle without departing from the scope of the present invention.

The engine 30 is preferably connected to a manual speed transmission with a clutch in a manner similar to those available on typical motorcycles. Alternatively, the three-wheeled vehicle 10 may use a CVT. Other types of transmissions are contemplated and remain within the scope of the present invention.

A fender assembly 40 is associated with each of the front wheels 14, 16. The fender assembly 40 prevents dirt, water and road debris from being thrown up onto the rider, while the rider operates the vehicle 10. Each fender assembly 40 is linked to the front suspension assembly 26 and a steering assembly 34 such that the fender assemblies 40 move with the wheels 14 and 16 during steering of vehicle. This arrangement ensures that the tires will not throw dirt, water and road debris at the operator as the vehicle 10 turns. Each fender assembly 40 preferably includes a turn signal 42 located on the top surface of fender assembly 40, as shown in FIGS. 1 and 2.

The steering of the front wheels 14 and 16 is accomplished through the use of the steering assembly 34. The steering assembly 34 includes handlebars 32 and steering linkages (not shown) connected to the wheels 14 and 16 for purposes of turning the wheels 14 and 16 in response to movement of the handlebars 32. The steering assembly 34 of the vehicle 10 is preferably provided with a progressive steering system (not shown).

The front of the vehicle 10 includes a fairing assembly 36, which encloses the engine 30 to protect it and to provide an external shell that can be decorated so that the vehicle 10 is aesthetically pleasing. The fairing assembly 36 is preferably made from fibreglass having a gel coat, although other materials including plastic are considered to fall within the scope of the invention. The fairing assembly 36 includes an upper portion, a hood removably secured to the upper portion and a bottom pan. The fairing assembly 36 is secured to the vehicle frame assembly 12 by a plurality of fairing anchors.

The vehicle 10 of FIG. 1 is designed with a straddle-type seat assembly 20 that preferably accommodates two adult-sized riders, a driver and a passenger. Thus, the seat assembly 20 defines a driver portion 22 and a passenger portion 24 behind and adjacent the driver portion 22. While the vehicle 10 is not designed to accommodate more than two adult-sized riders, the present invention contemplates that the design of vehicle 10 may be changed easily to accommodate more than two adult-sized riders. The vehicle 10 includes a cushioned rider seat assembly 20 that is mounted to the frame assembly 12 between the front wheels 14 and 16 and the rear wheel 18, as shown in FIGS. 1 and 2. The seat assembly 20 is connected to the vehicle frame assembly 12 with a seat support assembly 172. The seat assembly 20 is positioned so that the mass of the rider thereon will be disposed generally above the suspension 28 of the frame assembly 40. Consequently, the mass of the rider will be transferred through the seat assembly 20 and frame assembly 12 to the rear suspension assembly and the rear swing arm 28 and to the front suspension assembly 26.

Still referring to FIG. 1, it can be seen that the center of gravity 52 of a driver sitting on the driver seat portion 22 in a normal sitting position looking forward with legs on each side of the vehicle is lower than the center of gravity 54 of a passenger sitting on the passenger seat portion 24 in a normal sitting position looking forward with legs on each side of the vehicle. The combined center of gravity 56 of the vehicle with only a driver is lower than the combined center of gravity 58 of the vehicle with a driver and a passenger. The additional mass provided by a passenger on the vehicle has a significant effect on the overall mass of the vehicle. This increased mass with the higher center of gravity 58 has a significant effect on the stability and the dynamic behaviour of the vehicle and therefore must be monitored and used when calculating the corrective measures.

Vehicle 10 is equipped with an Electronic Stability System (ESS) 140 (FIG. 3) which continuously monitors different vehicle parameters and applies corrective measures, i.e. wheel braking and/or engine torque management, whenever the vehicle parameters indicate the vehicle is in an unstable state. The ESS, mounted onboard vehicle 10, uses predetermined calibration data commonly disposed on a graph (or mapping) to determine which outputs (i.e. corrective measures) should be provided given specific inputs based on the vehicle parameters, one of which is the mass of the combined vehicle and passenger. The magnitude and the timing of the outputs are also managed by the ESS 140 in order to apply the appropriate corrective measures to the vehicle 10. In the present invention, the term calibration is used to describe a mathematical formula, a map, an algorithm or a value used to determine the outputs of the ESS based on the inputs.

The ESS 140 is dependent on inputs provided by sensors sensing the vehicle's behaviours to determine what are the right outputs to be generated. A series of sensors can be used for sensing different physical properties, as shown on FIG. 3. This list of sensors is for illustrative purposes and does not intend to limit the scope of this application to the listed sensors but to all state of the art sensors in the automotive field. Published United States patent application number US 2006/0180372A1, filed Aug. 18, 2004 and assigned to the same assignee provides more information about an ESS 140 and related sensors and is enclosed herewith by reference.

In the present embodiments, there are four sensors 100, 102, 104 and 106 to accommodate a four-wheeled vehicle (not shown). Two sensors can be used on the same wheel when an ESS 140 designed for a four-wheeled vehicle is used with a three-wheeled vehicle 10. Steering angle sensor 108 provides information about the angular position of the steering assembly 34 from which can also be determined the steering angle rate (e.g. the speed at which the steering is rotated). Lateral and longitudinal acceleration sensors 110, 112 are in communication with the ESS 140 and provide information about the lateral and longitudinal accelerations of the vehicle 10. These accelerometers 110, 112 can be combined with a yaw rate sensor 114 sensing the yaw rate of the vehicle 10 about a vertical axis in addition to longitudinal and lateral accelerations.

A seat sensor 118 (or passenger load sensor) is installed in the passenger seat portion 24 to send signals to the ESS 140 about the presence or the absence of a passenger sitting on the vehicle 10. This sensor 118 will be discussed in greater detail below. A cargo sensor 120, substantially performing the same role as the seat sensor 118, is installed on the vehicle 10. For example, cargo can be put in storage compartment (not shown) disposed on the rear portion of the vehicle 10. The cargo sensor 120 can determine the presence of cargo and/or quantitatively determine how much load there is present in the saddlebags by using a strain gage or similar technology. A suspension sensor 122 provides information to the ESS 140 about the suspension deflection (or the height of the vehicle) based on the instant position of the suspension along the overall suspension travel to determine the mass supported by the suspension. It is well known that a spring compresses linearly according to the force applied to it, therefore the mass applied on the suspension can be deducted from the deflection of the suspension. Common linear position sensors can be used to monitor the suspension position.

A brake pressure sensor 116 informs the ESS 140 of the instant amount of pressure in the brake system. Many brake pressure sensors 116 can be required to monitor different portions of the hydraulic brake system; i.e. the front and rear brake systems. A brake light switch 124 sends a signal to the ESS 140 when the brakes are activated, even lightly, regardless of the amount of pressure generated in the brake system. A brake fluid level sensor 126 is installed in each brake fluid reservoir on the vehicle 10 and provides information on the brake fluid level to the ESS 140. A brake travel sensor 128, adapted to sense the brake actuator position, indicates hard braking from the driver to the ESS 140. The brake travel sensor 128 is activated after the brake light switch 124 to determine, for example, strong intentional brake actuation or extreme brake lever movement due to a loss of brake fluid pressure in the brake system.

An engine RPM sensor 130 informs the ESS of the rotational speed of the engine 30. A throttle position sensor 132 (TPS) determines how much the throttle is opened to allow air inside the combustion chamber of the engine 30; the throttle opening being calculated between 0° and 90°. A mass air flow sensor 134 indicates how much air is travelling through the throttle. All these sensors are well known in the art and will not be discussed in detail in this application. These sensors can be used individually or collectively to bring inputs usable by the ESS 140 to analyze the vehicle's behaviour such that appropriate outputs can be applied to the vehicle 10.

Figure 14:
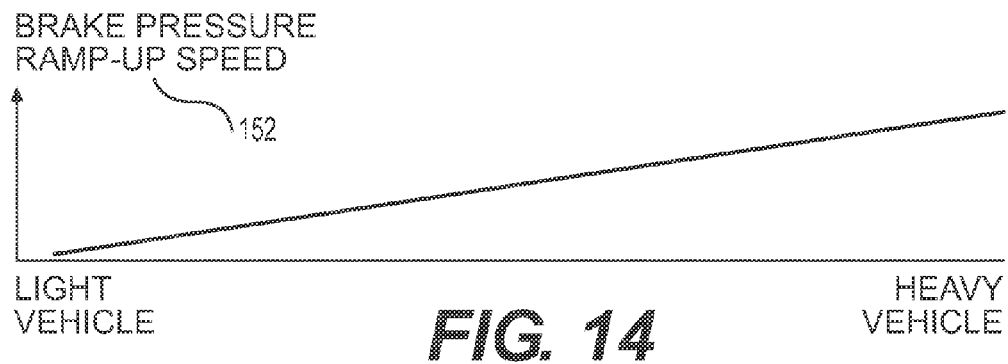
FIG. 14 is a diagram illustrating hydraulic brake pressure ramp-up speed in function of the mass of the vehicle according to the present invention.

Various outputs might be provided by the ESS 140 to influence the behaviour of the vehicle 10. The ESS 140 can send outputs to increase the brake pressure 150 (FIG. 15) in the brake system, thus forcing braking of the vehicle 10 by overriding manual actuation of the brake actuator from the driver. The ESS 140 can also increase or decrease the brake pressure ramp-up 152 (FIG. 14). The brake pressure ramp-up 152 is the speed at which the brake fluid pressure is raised to brake the vehicle 10 therefore providing a stronger and faster braking to the vehicle 10. Another output from the ESS 140 could be used to increase or decrease the stiffness 154 of the steering assembly 34. Change in the power output 156 of the engine 30 is normally done by the ESS 140 through the electronic control unit 158 (ECU) controlling the engine 30. The ECU 158 electronically modifies, individually or collectively, the ignition timing, the fuel injection timing and the amount of fuel injected in the combustion chamber.

Figure 4:
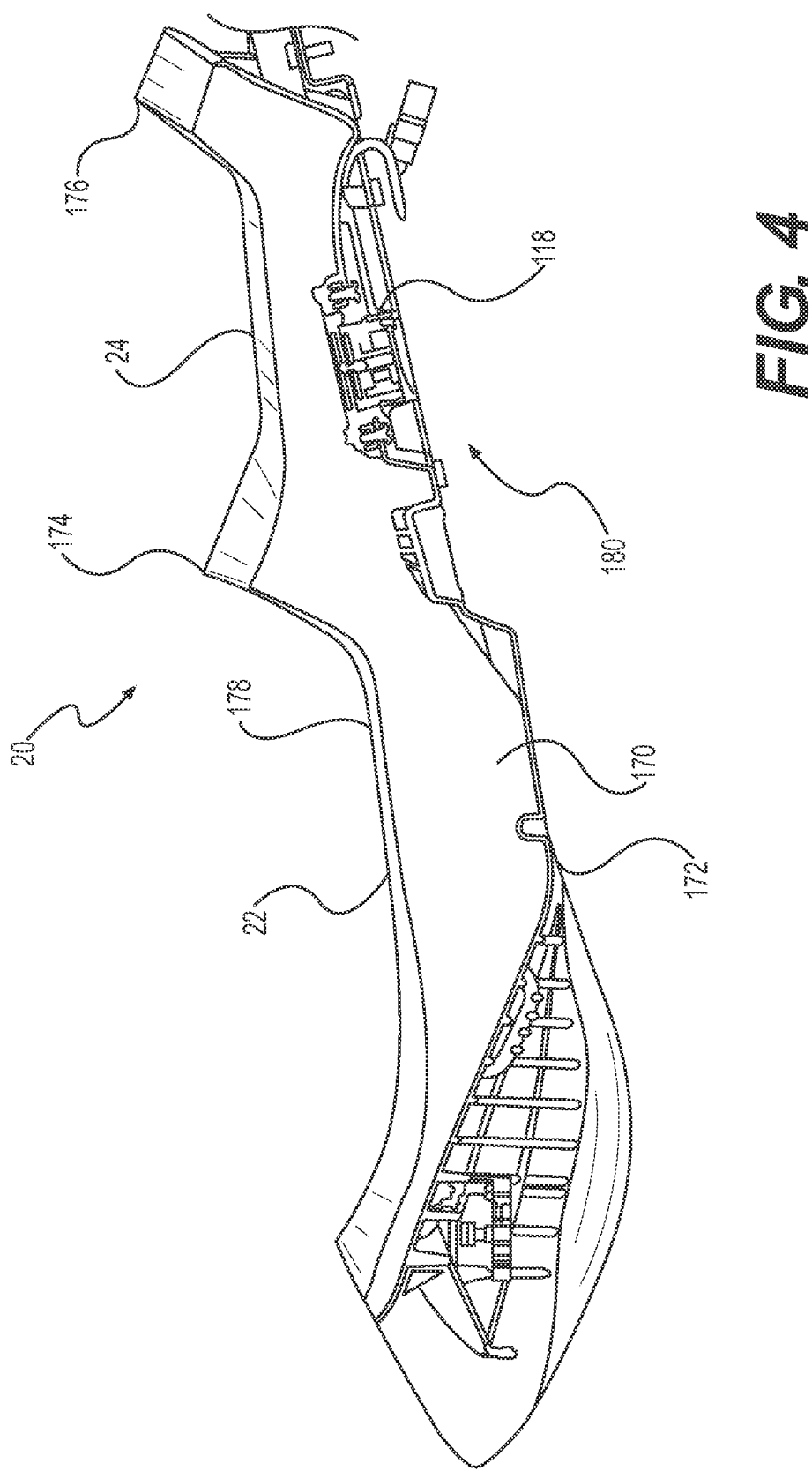
FIG. 4 is a longitudinal cross-sectional view of a straddle seat having a passenger seat sensor according to one embodiment of the present invention.

Referring to FIG. 4, a left side elevation section view of the seat assembly 20 with the driver seat portion 22 and the passenger seat portion 24 is shown. A driver backrest 174 separates the driver seat portion 22 from the juxtaposed passenger seat portion 24. The passenger seat portion 24 is ending with a passenger backrest 176 to provide support for the passenger when the vehicle 10 accelerates. The seat assembly 20 is constituted of a seat support assembly 172 on which is superposed a volume of foam 170 protected by a seat cover 178. A seat sensor 118 for sensing the presence or the absence of a passenger sitting on the passenger seat portion 24 is located in the seat assembly 20. It is attached to the seat support assembly 172 in the area supporting the mass 171 of a passenger sitting on the passenger seat portion 24. The seat sensor 118 could alternatively be fixed on the frame 12 of the vehicle 10 and fit into an opening in the bottom of the seat assembly 20 installed on the vehicle 10 without departing from the scope of the present invention. This arrangement would prevent damaging the seat sensor 118 when the seat assembly 20 is removed from the vehicle 10.

Figure 5:
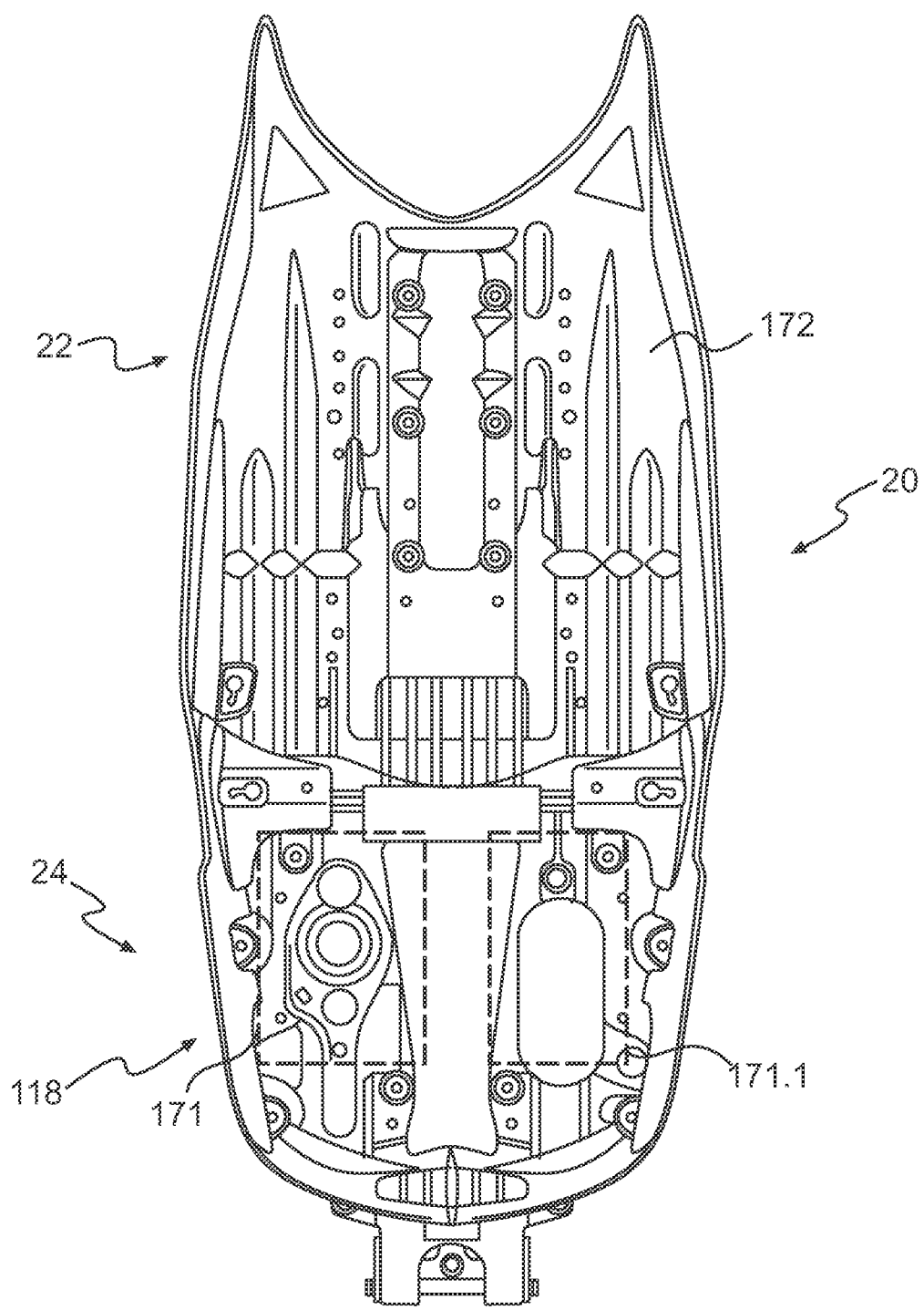
FIG. 5 is a bottom plan view of the straddle seat of FIG. 4.

FIG. 5 depicts a bottom plan view of the seat to show the position of the seat sensor 118 on the seat support assembly 172 with respect to the sitting position of a passenger on the passenger seat portion 24. The seat sensor 118 is preferably disposed in such a position 171 that the right sitting bone (one of the ischia bones of the passenger) is compressing the foam 170 just above the seat sensor 118. The alignment with a sitting bone ensures good mass transfer from the passenger to the seat sensor 118 (other seat sensor 118 positions in respect to the passenger sitting on the seat could work, however relying on the flesh of the passenger to activate the seat sensor 118 might be less precise). The seat sensor 118 is located to catch the mass of the right sitting bone in the present embodiment; however, the sensor could be located on the left side 171.1 of the seat 20 without departing from the scope of the invention.

Figure 6:
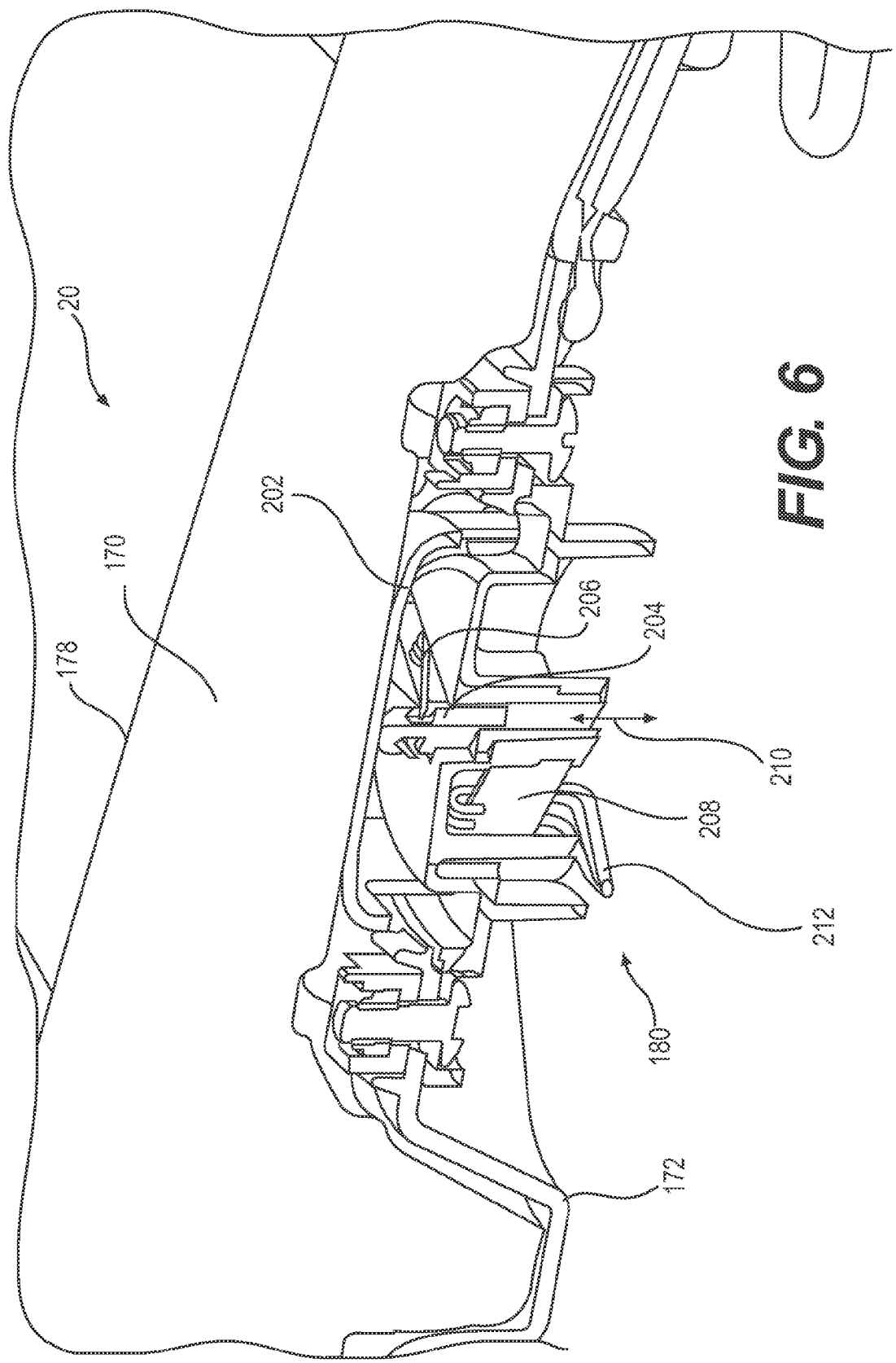
FIG. 6 is a close-up view of longitudinal cross-sectional view of FIG. 4.

In the illustrated embodiment, the seat sensor 118 is a Hall Effect seat switch provided by Delta Systems Inc. (part no. 6540-003 7AL). It can be appreciated from FIG. 6 that the moveable cover 202 of the seat sensor 118 is in contact with the bottom portion of the foam 170 in the seat assembly 20. Pressure applied on the seat assembly 20 will compress the foam 170 and will progressively activate the seat sensor 118. Pressure of the foam 170 on the vertically moveable cover 202 applies movement to the vertically moveable stem 204 enclosed in the seat sensor 118. The movement of the stem 204 alters the magnetic field of the Hall Effect portion 208 inside the seat sensor 118, hence changing the output voltage passing through wires 212 to the ESS 140. In the illustrative embodiment, the output voltage can fluctuate between 0 Volts and 5 Volts. The passenger presence is represented by the seat sensor 118 with a small voltage range, illustratively between 0.9 and 1.85 Volts. In contrast, the passenger absence is represented with a distinct voltage range, illustratively between 2.5 and 4.15 Volts. End voltages are used to determine faulty connections of the seat sensor 118. A voltage output of less than 0.5 Volts means the circuit is open or shorted to ground. Conversely, a voltage of more than 4.9 Volts is interpreted by the ESS 140 as being shorted to the battery. Remaining unassigned voltage ranges are safety intermediate positions. A classic on/off contact switch is also contemplated although it offers less flexibility than a Hall Effect sensor.

The ESS 140 uses some strategies to avoid misinterpreting the signal from the seat sensor 118. A time delay is applied before considering a change in the state of the sensor (e.g. from the passenger absence position to the passenger presence position and vice-versa). This helps prevent unintentional change in state of the seat sensor 118 like a passenger momentarily putting more mass on the footrests and unloading the seat. Foam density and thickness of the seat is also designed such that a minimum mass is required before the seat sensor 118 is activated. In the present situation, the foam thickness is smaller above the seat sensor 118 than elsewhere on the seat to make sure the sensor 118 will be activated when a predetermined pressure is applied on the seat. A minimum mass of about 10 kilograms is required before the seat sensor 118 gets into the passenger presence state.

The ESS 140 uses predetermined calibrations stored on a computer readable media inside the ESS 140. The data can be updated by connecting the ESS 140 on Internet through a computer to download into the ESS 140. Alternatively, the ESS 140 can use its Input/Output port to download updated calibrations. The calibration is used for determining outputs based on the inputs received from at least some of the plurality of sensors. One fundamental input is the actual total mass of the vehicle 10. The calibration is selected in function of the mass of the vehicle 10 to ensure the strength and timing of the outputs are corresponding with the overall mass of the vehicle 10. Each calibration is adapted to a different mass of the vehicle 10. Since no actual mass is provided to the ESS 140 at start-up, a start mass 232 will be used to define any ESS 140 outputs shortly after the vehicle begins to move. In a first embodiment, the start mass 232 is an estimation of the complete mass of the vehicle 10 with a driver. This start mass 232 is unlikely to accurately represent the actual exact mass of the vehicle 10 with the driver due to the different people who will use the vehicle and the cargo each will wish to bring with them. It is therefore likely to lead the ESS 140 to provide outputs that are either over or bellow what is really required by the actual exact mass of the vehicle 10 and may negatively affects the vehicle's behaviour.

Figure 7:
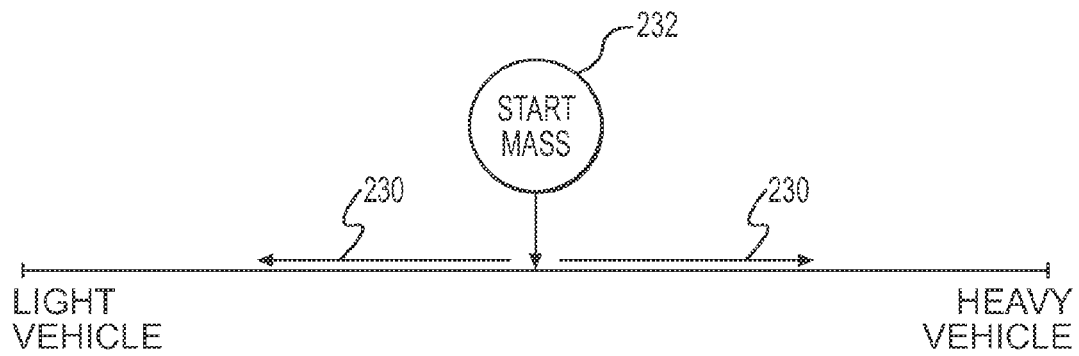
FIG. 7 is a diagram showing a mass estimation strategy according to another one embodiment of the present invention.

The first embodiment is depicted by FIG. 7, one strategy consists in using a start mass 232 that is an estimated mass of a fully loaded vehicle 10 (oil, gas, coolant, etc.) with a driver, a passenger and even a bit of additional cargo. This start mass 232 is used by the ESS 140 to calculate any initial corrective measures needed. A person skilled in the art can readily understand the ESS 140 is unlikely to provide appropriate outputs if the vehicle is more heavily loaded with a heavier passenger and a lot of cargo. Conversely, the ESS 140 will provide too strong corrections to the vehicle in the case of a light driver with no passenger and therefore adversely affect the vehicle's performance. The correcting measures provided by the ESS 140 must preferably take this mass variation into consideration. A more accurate total mass estimation is desirable in order for the ESS 140 to apply the correct measures which do not render the vehicle less performant nor too aggressive.

Figure 8:
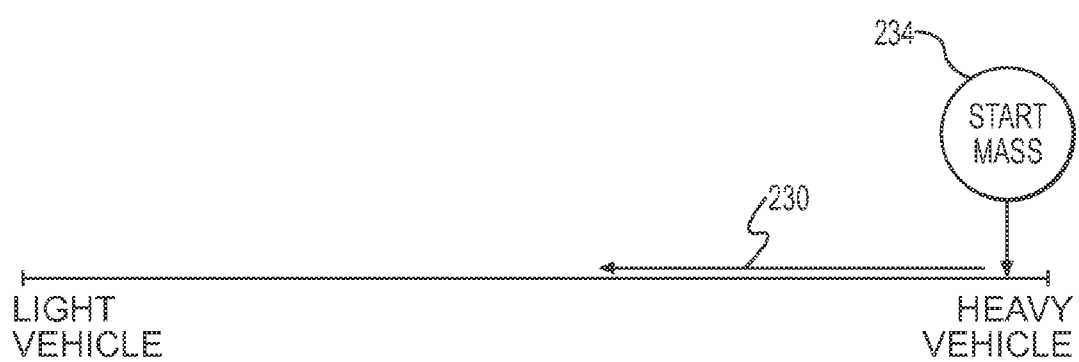
FIG. 8 is a diagram showing a mass estimation strategy according to one embodiment of the present invention.

Still referring to FIG. 7, one would appreciate that the start mass 232 has a significant effect on the performance of the vehicle. To make sure the vehicle is safe when a heavy driver and a heavy passenger with cargo are onboard, the start mass 234 should be increased as indicated in a second embodiment illustrated in FIG. 8. In this scenario, the ESS 140 outputs will safely take into consideration the possible heavy mass of the vehicle 10. The start mass 234 should be high enough to ensure adequate safety, although, in turn, the ESS 140 will significantly reduce the performance of the vehicle, even if only a single light driver is onboard the vehicle is stable in all riding conditions.

Figure 9:
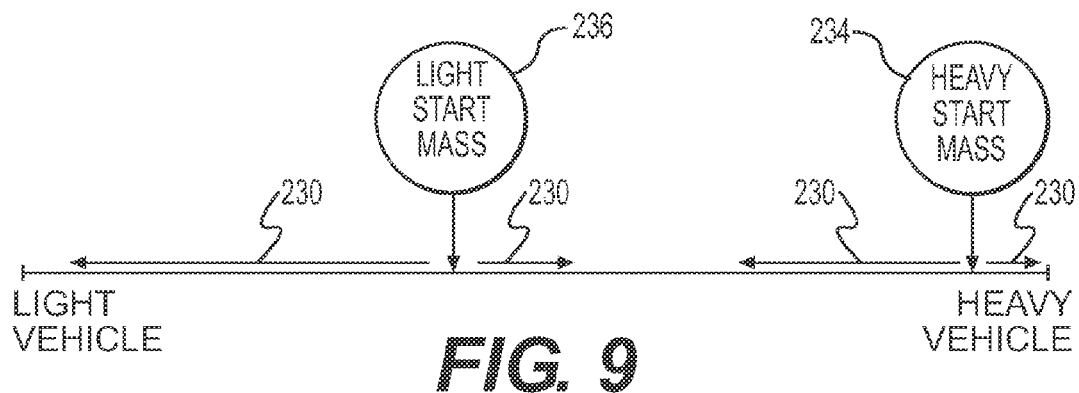
FIG. 9 is a diagram showing a mass estimation strategy according to yet another embodiment of the present invention.

For this reason, it is better to have two start masses 234, 236, as shown in FIG. 9 illustrating a third embodiment. This ensures sufficient safety when the vehicle 10 accommodates both a driver and a passenger and significantly reduces the adverse effects on the vehicle's performance if only a driver is detected on the vehicle 10. The passenger seat sensor 118 is used to determine the presence or the absence of a passenger on the passenger seat portion 24 of the vehicle 10. In other words, if the passenger seat sensor 118 is in the passenger absence position, a first calibration, having a start mass 236, would be used. The start mass 236 is estimated to be close to the maximum mass allowed for vehicle 10 with a single driver. Start mass 236 is also updated with continuously calculated mass changes 230 on both the heavier and the lighter sides. This way the vehicle 10 will provide maximum performance while preventing exceeding the safe handling threshold.

On the other hand, if the vehicle 10 supports both a driver and a passenger, the passenger seat sensor 118 is in the passenger presence position. A second calibration having a start mass 234 is used taking into account that the vehicle supports a passenger and is therefore more heavily loaded. The start mass 234 is estimated to be close to the maximum mass allowed for vehicle 10 with a driver and passenger. Start mass 234 will also be uploaded with continuously calculated mass changes 230 on both the heavier and the lighter sides. This way, the ESS 140 will provide maximum safety and will prevent exceeding the safe handling threshold.

With the information provided by the passenger seat sensor 118 and the use of various start masses 236, 234, it is possible to provide adequate vehicle safety while not adversely affecting the performance of the vehicle 10.

Strategies can be used to improve the accuracy of the start masses 236 and 234 during vehicle operation. One strategy uses the well-known formula "F=m·a" to obtain a calculated mass 231 where "F" is a force in Newton, "m" is a mass in kilogram and "a" is an acceleration in "m/(s$^2$)". The ESS 140 uses either the vehicle's accelerations or decelerations to define the variable "a" and deduct a calculated mass 231 of the vehicle 10. We will first discuss using the acceleration.

The ESS 140 senses the throttle opening with the Throttle Position Sensor 132 and the RPM of the engine 30 with the engine RPM sensor 130. Then the ESS 140 refers to a calibration as seen on FIG. 10, to determine the torque provided by the engine 30 under such throttle opening condition and engine RPM. This torque has been experimentally calibrated according to various TPS positions and engine RPM as shown in FIG. 11. The ESS 140 uses the torque "τ" obtained from the calibration and divides it by the radius "r", in meters, of the wheel of the vehicle (and, if needed, taking into account any relevant transmission ratio) to get a force "F" in "Newtons" (τ=F·r therefore F=τ/r). The ESS 140 also has data on the acceleration "a" of the vehicle in "m/s$^2$" provided by the longitudinal accelerometer 112. The equation "F=m·a" is then applied to isolate the mass "m" (m=F/a), that is the calculated mass 231. Iterations of this calculated mass 231 according to real life data periodically recalculate the calculated mass 231 to ensure its accuracy. The calculated mass 231 must be reliable because it influences the start mass 236 by increasing or decreasing the start mass 236. The calculated mass 231 provides the ESS 140 with a more accurate total mass estimation of the vehicle 10 for determining the most accurate outputs from the ESS 140.

Figure 12:
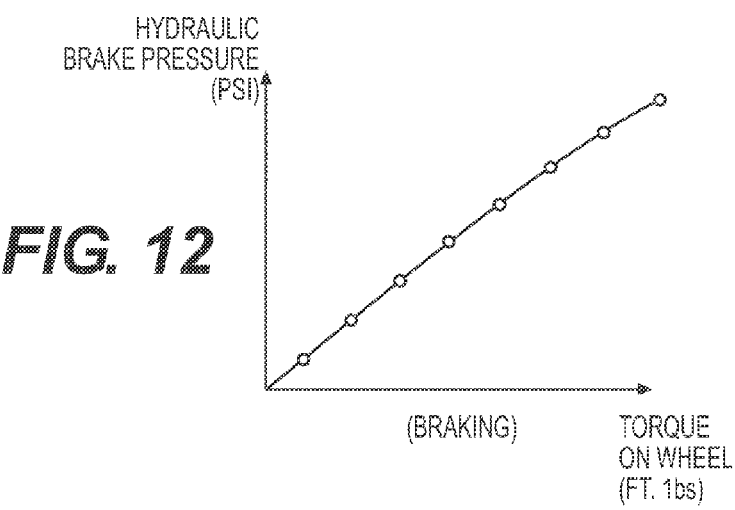
FIG. 12 is a diagram illustrating the brake torque applied on the wheels of the vehicle in relation with hydraulic brake pressure according to an other embodiment of the present invention.

The same principle is used in the case of decelerations although the inputs used to adjust the start mass 236 are different. In the case of a deceleration, the ESS 140 senses the brake pressure with the brake pressure sensor 116. Similarly, the brake pressure has previously been experimentally calibrated as provided by FIG. 12. For a given pressure in the hydraulic system, the ESS 140 determines a brake torque in "N·m" and divides it by the radius of the wheel, in meters "m", to obtain a force in "Newtons". The ESS 140 also has data on the deceleration "a" of the vehicle obtained by the longitudinal accelerometer 112. Again, the equation "F=m·a" is applied to isolate the mass "m" (m=F/a). Iterations of this calculated mass 231 according to real inputs influences the start mass 236 by increasing or decreasing the start mass 236. The calculated mass 231 provides the ESS with a more accurate total mass estimation of the vehicle 10 for determining the most accurate outputs from the ESS 140.

In other words, the ESS 140 uses a start mass 236 that is a fixed default value. A safe calculated mass 231 is obtained by the ESS 140 by analysing the inputs in real time based on the vehicle's behaviours. The exact overall mass of the vehicle is somewhere in between.

Further calculated mass 231 estimation iterations will adjust the selected start mass 234, 236 toward an even more accurate mass. The iterations are made by the ESS 140 only when conditions are favourable to get a reliable calculated mass 230. For example, the ESS 140 does not get inputs for analysing the mass of the vehicle 10 when the vehicle 10 is negotiating a curve based on the input from the steering angle sensor 108. Strong and weak accelerations/decelerations are also not considered because of the increased risk of errors.

Figure 10:
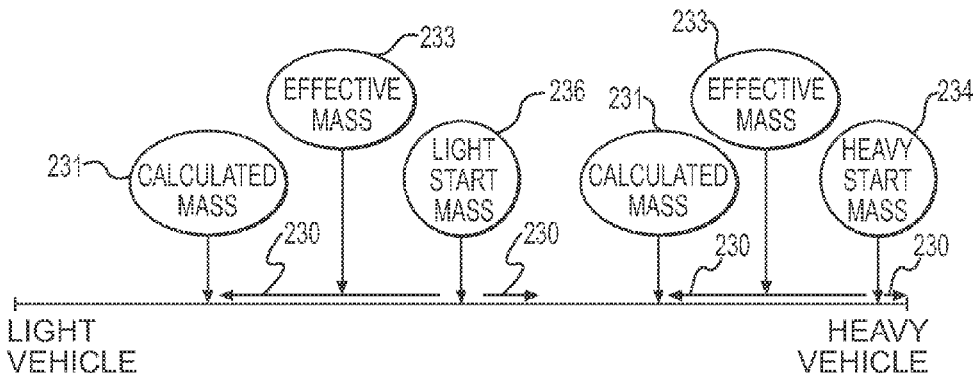
FIG. 10 is a diagram showing a mass estimation strategy according to another embodiment of the present invention.
Figure 11:
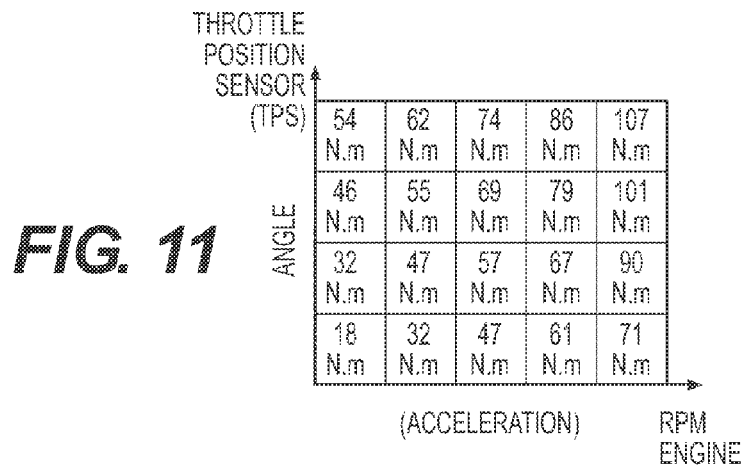
FIG. 11 is a calibration of the engine torque associated with various values from a throttle position sensor and various engine RPM according to one embodiment of the present invention.

Referring to FIG. 10, a calibration is depicted where the number of iterations validating the calculated mass 231 is another factor taken into consideration during this iterative mass adjustment process. The higher the number of iterations, the more accurate the calculated mass 231 is considered to be. For example, a very small percentage of the mass difference between the start mass 236 and the calculated mass 231 is applied to the start mass 236 after one iteration. The portion of the difference between the calculated mass 231 and the start mass 236 is added or subtracted from the start mass 236 to define an effective mass 233 subsequently used by the ESS 140 to determine the right corrective measures. The percentage of the mass difference applied to the mass used by the ESS 140 (either the start mass 236 on the first iteration or the effective mass 233 on subsequent iterations) increases with the number of iterations. The higher the number of iterations, the bigger the percentage of the mass difference is applied to the mass used by the ESS 140. Only a slight change will be made to the start mass 236 during the first calculated mass iteration no matter how significant the calculated mass 231 differs from the start mass 236. After many iterations, for example five hundred (500), the effective mass 233 will be mostly replaced with the calculated mass 231. This is another safety measure to prevent any possibility of applying an erroneous mass to the ESS 140. This also shows that a certain amount of time is needed under favourable operating conditions before a reliable mass is calculated. This illustrates the advantages of having a start mass when the vehicle begins to move. It also illustrates the advantages of having a seat sensor 118, which provides an indication to the ESS 140 to use a second start mass 236 which is closer to the actual mass with the passenger(s). It is also contemplated that for a given sensor 118 output, a value is added to the first mass representing an added mass to the vehicle 10. Depending on the sensor 118 output, different values can be added to the start mass 236 to indicate riders of different mass seating on the vehicle 10.

Figure 13:
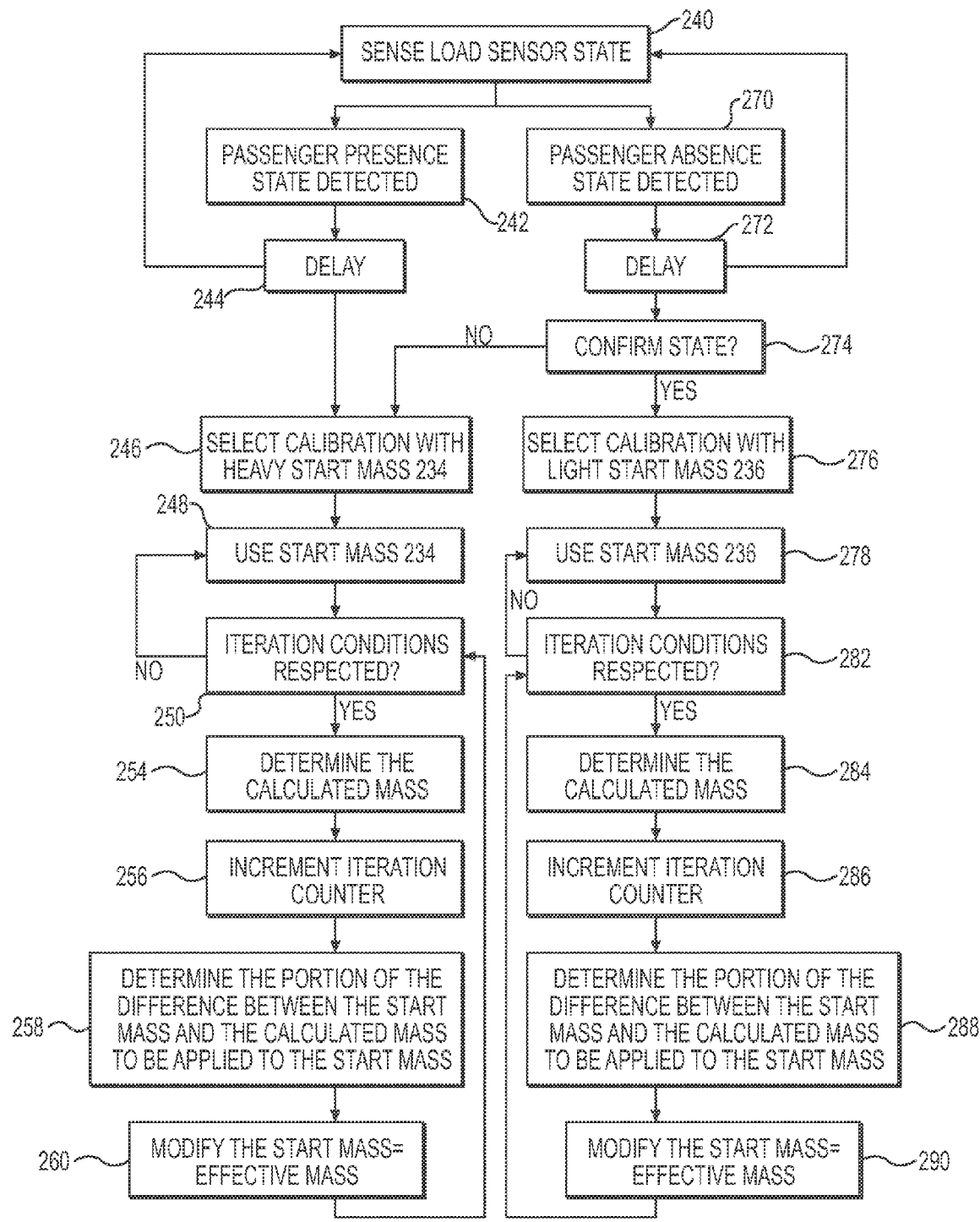
FIG. 13 is a logic diagram illustrating the strategy of FIG. 10.

FIG. 13 illustrates a flow chart referring to FIG. 10 indicating one possible logic from the moment the seat sensor 118 state is sent to the calculated mass 231 iterations. The ESS 140 senses the state at step 240 of the seat sensor 118 (or load sensor). A delay is applied at step 244 to validate the state of the seat sensor 118 if the presence of a passenger is detected at step 242 to prevent the ESS 140 to act upon a wrong input. The calibration is selected at step 246 and start mass 234 is used at step 248 by the ESS 140 to calculate the right corrective measures to be applied. The ESS 140 will begin to determine the calculated mass 231 using successive iterations if the conditions are satisfied at step 250. If the iteration conditions are not satisfied at step 250, the ESS 140 will continue reusing the start mass 234. If the iteration conditions are satisfied, the ESS 140 will determine at step 254 the new calculated mass 231 and will increase the iteration counter at step 256. An applicable percentage of the mass difference between the calculated mass 231 and the start mass 234 will be determined at step 258 by the number of successful iterations performed by the ESS 140. The applicable percentage of the mass difference will be added or subtracted to the start mass 234 to become the effective mass 233. The higher the number of iterations, the larger the portion of the mass difference is applied, at step 260, to the start mass 234. If the iteration conditions at step 250 are still respected, a new iteration will occur and the cycle continues until the iteration conditions at step 250 are not met, at which point the last effective mass calculated will be used.

In contrast, if the ESS 140 senses the state at step 240 of the seat sensor 120 and the presence of a passenger is not detected at step 270 a delay is also applied at step 272 to validate the state at step 274 of the seat sensor 118 to prevent the ESS 140 to act on a wrong input. The calibration is selected at step 276 and start mass 236 is used at step 278 by the ESS 140 to determine the right outputs to be applied. The ESS 140 will begin to determine the calculated mass 231 using successive iterations if the conditions are satisfied at step 282. If the iteration conditions are not satisfied at step 282, the ESS 140 will continue reusing the start mass 236. If the iteration conditions are satisfied, the ESS 140 will determine at step 284 the new calculated mass 231 and will increase the iteration counter at step 286. An applicable percentage of the mass difference between the calculated mass 231 and the start mass 236 will be determined at step 288 by the number of successful iterations performed by the ESS 140. The applicable percentage of the mass difference will be added or subtracted to the start mass 236 to become the effective mass 233. The higher the number of iterations the larger the percentage of the mass difference is applied, at step 290, to the start mass 236 will be. If the iteration conditions at step 282 are still respected, a new iteration will occur and the cycle continues until the iteration conditions at step 282 are not met. Various other logics could also be designed by someone having skills in the art of programming an ESS 140 to achieve similar results without departing from the scope of the present invention.

Figure 15:
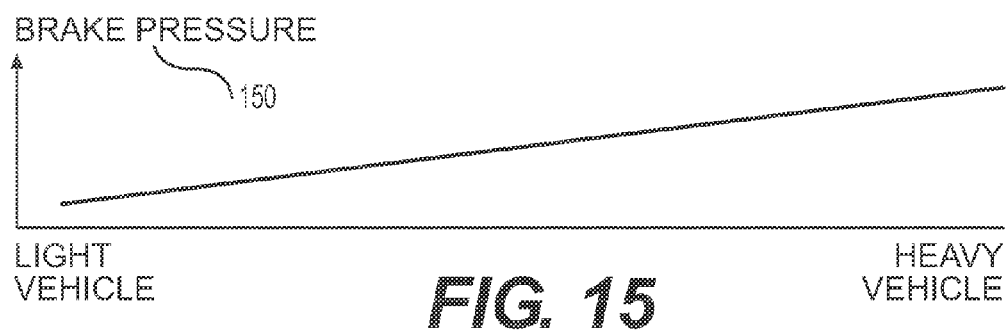
FIG. 15 is a diagram illustrating hydraulic brake pressure in function of the mass of the vehicle according to the present invention.

The mass of the vehicle 10 effects the vehicle's behaviour thus the magnitude and reaction time of an effective corrective measure. Lets take for example a vehicle having a mass X negotiating a curve at a speed S and the same vehicle in the same curve at the same speed S but with a more significant mass X+Y. The corrective measures of the former are unlikely to be acceptable in the latter case because the mass of the vehicle is significantly increased. The corrective measures based on the vehicle of mass X is unlikely to apply a corrective measure fast enough or with enough magnitude to keep the vehicle of mass X+Y stable, thus the advantage of having a seat sensor 120 to tell the ECU 140 which start mass 234 or 236 to use. The opposite scenario is also preferred to avoid where the corrective measures are calculated using mass X+Y when the actual mass is X. This will cause the magnitude and reaction time to be larger and shorter than needed thus having a negative effect on the vehicle performance. As illustrated in FIGS. 14 and 15, the outputs from the ESS 140 depend on the overall mass of the vehicle and mass applied thereon. The heavier the vehicle 10, the faster and larger the ESS corrective measures must be to keep the vehicle 10 within a stable condition. FIG. 14 shows that the brake pressure ramp-up speed is faster with a heavy vehicle 10 to provide timely interventions. This is why the pressure increase in the brake system is ramping-up faster. The opposite action, decreasing the pressure in the brake system, would also be faster with a heavy loaded vehicle 10. Referring to FIG. 15, the operating brake pressure is also higher with a heavy-loaded vehicle to provide sufficient braking force. A low operating brake pressure is insufficient to provide the required braking force for a heavy loaded vehicle even if sufficient for braking a lightly loaded vehicle. The engine 30 power output of the vehicle is also another parameter managed by the ESS either by altering the ignition, fuel injection, air intake opening or limiting the maximum RPM.

It is contemplated that a quantitative mass of the vehicle can be obtained with additional sensors. With a quantitative mass, the ESS 140 could select a more accurate calibration to determine the optimal corrective measures. A suspension deflection sensor 122 or a strength gage properly disposed on rightly selected structural parts of the vehicle 10 would provide quantitative data about the mass of the vehicle under any load conditions. A quantitative mass evaluation is providing the ESS with an accurate mass to determine the type and the magnitude of the corrective measures required to improve the handling and the behaviour or the vehicle 10. In this case, it is likely that no mass iterations would be needed although they could be used to ensure that the sensed mass is accurate.

A roll sensor 136 installed on the vehicle 10 determines a roll angle of the vehicle 10. The roll angle sensed by the roll sensor 136 is compared to a pre-determined roll angle by the ESS 140. If the instant roll angle is above the pre-determined roll angle, the ESS 140 takes this roll angle into consideration. The pre-determined roll angle is set according to the mass of the vehicle 10. If the sensed roll angle is above the predetermined roll angle it means the center of gravity of the total mass of the vehicle and occupant(s) is higher than what is normally expected and the total mass of the vehicle and occupant(s) is significantly heavier than the mass used by the ESS 140. In both cases, the ESS 140 will change the corrective measures to reduce the vehicle 10 roll angle. The roll sensor 136 offers a simple way to provide a "reactive" investigation of the vehicle's behaviour. The ESS 140 can therefore adjust the corrective measures if the real physical roll angle of the vehicle 10 is greater than the acceptable pre-determined roll angle.

It should be appreciated by those skilled in the art that modifications and variations can be made to the embodiments of the invention set forth herein without departing from the scope and spirit of the invention as set forth in the appended claims and their equivalents.

What is claimed is:

1. A method of controlling a three-wheeled vehicle, the three-wheeled vehicle comprising:
   a frame;
   three wheels attached to the frame; and
   a straddle seat supported by the frame, the straddle-seat defining a driver portion and a passenger portion adjacent to the driver portion,
   the method comprising:
   determining a state of a load sensor associated with a portion of vehicle;
   selecting a first start mass when the load sensor is in a non-loaded state;
   selecting a second start mass when the load sensor is in a loaded state:
   determining at least one vehicle parameter during operation of the vehicle;
   determining a calculated mass based at least in part on the at least one vehicle parameter;
   determining an effective mass based at least in part on the calculated mass and a selected one of the first and second start masses;
   defining an output of an electronic stability system of the vehicle based at least in part on the effective mass; and
   controlling a stability of the vehicle using the output of the electronic stability system.

2. The method of claim 1, wherein:
   the first start mass is based on a driver-and-vehicle combined mass; and
   the second start mass is base one a driver-and-passenger-and-vehicle combined mass.

3. The method of claim 1, wherein determining the at least one vehicle parameter during operation of the vehicle includes determining an acceleration of the vehicle.

4. The method of claim 3, wherein determining the acceleration of the vehicle includes obtaining the acceleration of the vehicle from a longitudinal accelerometer of the vehicle.

5. The method of claim 3, wherein determining the at least one vehicle parameter during operation of the vehicle further includes determining a torque provided by an engine of the vehicle; and
   the calculated mass is determined based on the acceleration of the vehicle and the torque provided by the engine.

6. The method of claim 3, wherein the calculated and effective masses are not determined when the acceleration of the vehicle is outside of a predetermined range.

7. The method of claim 1, wherein determining the at least one vehicle parameter during operation of the vehicle includes determining a torque provided by an engine of the vehicle.

8. The method of claim 7, wherein determining the torque provided by the engine of the vehicle includes:
   obtaining a degree of throttle opening from a throttle position sensor; and
   obtaining a speed of the engine from an engine speed sensor.

9. The method of claim 1, wherein determining the at least one vehicle parameter during operation of the vehicle includes determining a deceleration of the vehicle.

10. The method of claim 9, wherein determining the deceleration of the vehicle includes obtaining the deceleration of the vehicle from a longitudinal accelerometer of the vehicle.

11. The method of claim 9, wherein determining the at least one vehicle parameter during operation of the vehicle further includes determining a brake torque; and
    the calculated mass is determined based on the deceleration of the vehicle and the brake torque.

12. The method of claim 9, wherein the calculated and effective masses are not determined when the deceleration of the vehicle is outside of a predetermined range.

13. The method of claim 1, wherein determining the at least one vehicle parameter during operation of the vehicle includes determining a brake torque.

14. The method of claim 13, wherein determining the brake torque includes obtaining a brake pressure from a brake pressure sensor.

15. The method of claim 1, further comprising determining if the vehicle is turning; and
    wherein the calculated and effective masses are not determined when the vehicle is turning.

16. The method of claim 15, wherein determining if the vehicle is turning is based on an input from a steering angle sensor.

17. The method of claim 1, wherein determining the effective mass includes:
    determining a difference between the calculated mass and the selected one of the first and second start masses:
    determining a percentage of the difference to be applied to the selected one of the first and second start masses;
    adding the percentage of the difference to the selected one of the first and second start masses when the calculated mass is greater than the selected one of the first and second start masses; and
    subtracting the percentage of the difference from the selected one of the first and second start masses when the calculated mass is smaller than the selected one of the first and second start masses.

18. The method of claim 17, further comprising repeating the steps of determining the at least one vehicle parameter, the calculated mass and the effective mass over a number of iterations;
   wherein the percentage of the difference to be applied to the selected one of the first and second start masses increases as the number of iterations increases.

19. The method of claim 1, further comprising validating the state of the load sensor when the load sensor is determined to be in a loaded state by applying a delay after the load sensor is determined to be in a loaded state.

* * * * *

UNITED STATES PATENT AND TRADEMARK OFFICE
CERTIFICATE OF CORRECTION

| | | |
|---|---|---|
| PATENT NO. | : 9,020,744 B2 | Page 1 of 1 |
| APPLICATION NO. | : 14/026435 | |
| DATED | : April 28, 2015 | |
| INVENTOR(S) | : Mario Dagenais | |

It is certified that error appears in the above-identified patent and that said Letters Patent is hereby corrected as shown below:

Claims

Claim 1, Column 15, line 51, "loaded state:" should read -- loaded state; --

Claim 17, Column 16, line 57, "start masses:" should read -- start masses; --

Signed and Sealed this
Fifteenth Day of September, 2015

Michelle K. Lee
*Director of the United States Patent and Trademark Office*